(12) United States Patent
Hirayama et al.

(10) Patent No.: US 11,067,462 B2
(45) Date of Patent: Jul. 20, 2021

(54) SENSOR

(71) Applicant: YOKOGAWA ELECTRIC CORPORATION, Tokyo (JP)

(72) Inventors: Toru Hirayama, Tokyo (JP); Yusaku Yoshida, Tokyo (JP); Atsushi Yumoto, Tokyo (JP); Tatsuhiko Miyauchi, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 310 days.

(21) Appl. No.: 16/042,349

(22) Filed: Jul. 23, 2018

(65) Prior Publication Data
US 2019/0064023 A1 Feb. 28, 2019

(30) Foreign Application Priority Data

Aug. 22, 2017 (JP) .............................. JP2017-159401

(51) Int. Cl.
*G01L 13/02* (2006.01)
*F17C 13/02* (2006.01)
*G01L 19/04* (2006.01)
*G01L 19/14* (2006.01)

(52) U.S. Cl.
CPC .......... *G01L 13/025* (2013.01); *F17C 13/025* (2013.01); *F17C 13/026* (2013.01); *G01L 19/04* (2013.01)

(58) Field of Classification Search
CPC ...... G01L 13/025; G01L 19/04; G01L 19/142; G01L 19/0645; G01L 19/0672; G01L 19/0084; G01L 7/18; F17C 13/026; F17C 13/025; G01K 5/02
See application file for complete search history.

(56) References Cited

U.S. PATENT DOCUMENTS

| 4,238,964 A * | 12/1980 | Wolf ................... G01L 9/0072 |
| | | 73/708 |
| 4,452,069 A * | 6/1984 | Hattori ................ G01L 19/0038 |
| | | 73/35.12 |
| 5,741,974 A | 4/1998 | Uemura |
| 2013/0223031 A1* | 8/2013 | Schmieder ......... H05K 3/4046 |
| | | 361/760 |

FOREIGN PATENT DOCUMENTS

JP S63-070043 U 5/1988

* cited by examiner

Primary Examiner — Peter J Macchiarolo
Assistant Examiner — Anthony W Megna Fuentes
(74) Attorney, Agent, or Firm — Osha Bergman Watanabe & Burton LLP

(57) ABSTRACT

A sensor includes: a pressure vessel filled with an enclosed liquid; a diaphragm that seals the pressure vessel; a sensor body contained in the pressure vessel; an electric wire comprising a wiring electrically connected to the sensor body; a fixture that fixes the electric wire to the pressure vessel; a first fillet at a joining portion between the electric wire and the fixture, wherein the first fillet contacts the enclosed liquid; and a second fillet at a joining portion between the fixture and the pressure vessel, wherein the second fillet contacts the enclosed liquid.

17 Claims, 4 Drawing Sheets

SENSOR

TECHNICAL FIELD

The present invention relates to a sensor.

Priority is claimed on Japanese Patent Application No. 2017-159401, filed Aug. 22, 2017, the contents of which are incorporated herein by reference.

BACKGROUND ART

Conventionally, a sensor as disclosed in Japanese Utility Model Application Publication No. S63-070043 is known. The sensor includes a pressure vessel filled with enclosed liquid, a diaphragm which seals the pressure vessel, a sensor body contained in the pressure vessel, and a pin electrically connected to the sensor body. This sensor can transmit a pressure of fluid received by the diaphragm to the sensor body via the enclosed liquid. The detection result of the pressure of the enclosed liquid detected by the sensor body is output to the outside of the sensor via the pin as an electrical signal.

This sensor has a structure for preventing leakage of the enclosed liquid and for pulling the pin out. Specifically, a lower end opening portion of the pressure vessel is covered by a housing, and the pin is inserted into a through hole formed in the housing. The pressure vessel and the housing are welded to each other, and a gap between the pin and the through hole is filled with sealing glass (refer to FIG. 5 of Japanese Utility Model Application Publication No. S63-070043).

This type of sensor is required to improve the pressure resistance so as not to generate a breakage of each member and a leakage of the enclosed liquid even if a high pressure exceeding several hundred MPa, for example, acts on the enclosed liquid filled in the pressure vessel.

However, when such the high pressure acts on the enclosed liquid, a large stress acts on joining portions between the members, and these joining portions may be peeled off. Particularly, it is difficult in many cases to increase the strength of the joining portions for joining different materials and also difficult to improve the pressure resistance of the sensor.

SUMMARY

A sensor may include a pressure vessel which is filled with an enclosed liquid, a diaphragm which seals the pressure vessel, a sensor body which is contained in the pressure vessel, an electric wiring member comprising a wiring electrically connected to the sensor body, a fixing member which fixes the electric wiring member to the pressure vessel, a first fillet formed at a joining portion between the electric wiring member and the fixing member, which is in contact with the enclosed liquid, and a second fillet formed at a joining portion between the fixing member and the pressure vessel, which is in contact with the enclosed liquid.

Further features and aspects of the present disclosure will become apparent from the following detailed description of one or more embodiments with reference to the attached drawings.

DETAILED DESCRIPTION

Embodiments of the present invention will be now described herein. Those skilled in the art will recognize that many alternative embodiments can be accomplished using the teaching of one or more embodiments and that the present invention is not limited to embodiments illustrated herein for explanatory purposes.

One or more embodiments of the present invention improve the pressure resistance of the sensor.

Hereinafter, a configuration of the sensor according to one or more embodiments will be described with reference to FIG. 1 and FIG. 2. In each drawing used in the following description, the scale is appropriately changed in order to make each member recognizable size.

Figure 1:
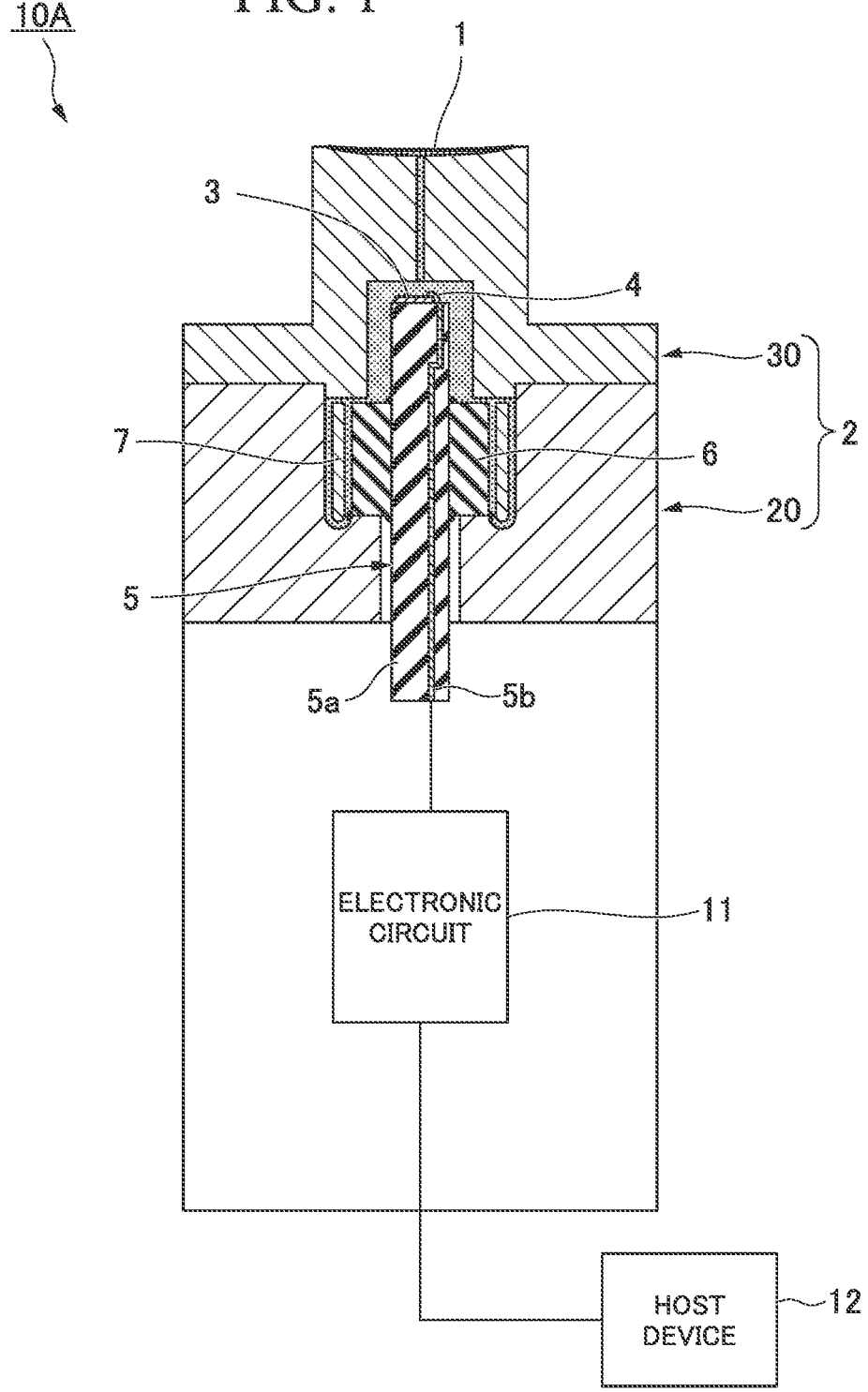
FIG. 1 is a drawing illustrating a vertical section of the sensor according to one or more embodiments.

As shown in FIG. 1, a sensor 10A includes a pressure vessel 2 filled with enclosed liquid, a diaphragm 1 which seals the pressure vessel 2, a sensor body 3 contained in the pressure vessel 2, an electric wiring member (or electric wire) 5 projecting from the inside to the outside of the pressure vessel 2, a fixing member (or fixture) 6 (first fixing member) for fixing the electric wiring member 5 to the pressure vessel 2, and a spacer member 7. For example, silicone oil may be used as the enclosed liquid filled in the pressure vessel 2.

The diaphragm 1 comes into contact with liquid or gas, as a detection target, which is outside the pressure vessel 2.

The sensor 10A is disposed in a fluid such as liquid or gas. The sensor 10A detects a pressure of the fluid and outputs the detection result to a host device 12. More specifically, the pressure of the fluid received by the diaphragm 1 is transmitted to the sensor body 3 via the enclosed liquid. The sensor body 3 is a pressure sensor for detecting the pressure of the enclosed liquid, and outputs an electrical signal corresponding to the pressure to an electronic circuit 11.

The electronic circuit 11 is a calculator for converting the electrical signal output by the sensor body 3 into a signal indicating the pressure or the like. The electronic circuit 11 outputs the calculation result to the host device 12 which is outside the sensor 10A.

Since there is a correlation between the temperature rise amount of the enclosed liquid and the pressure detected by the sensor body 3, the sensor 10A may be used as a temperature sensor.

(Direction Definition)

The pressure vessel 2 has a cylindrical vessel body 20 and a columnar lid member (or lid) 30. In one or more embodiments, a center axis of the vessel body 20 and a center axis of the lid member 30 are located on a common center axis O (refer to FIG. 2). Hereinafter, in a plan view as viewed from the center axis O, a direction orthogonal to the center axis O is called as a radial direction, and a direction revolving around the center axis O is called as a circumferential direction.

A direction along the center axis O is called as a vertical direction, a side of the lid member 30 in the vertical direction is called as an upper side, and a side of the vessel body 20 is called as a lower side. A section along the center axis O is called as a vertical section.

(Pressure Vessel)

The vessel body 20 and the lid member 30 of the pressure vessel 2 are made of the same material. For example, as the material of the vessel body 20 and the material of the lid member 30, a metal such as a nickel-based superalloy may be used. The vessel body 20 and the lid member 30 are not necessary to be made of the same material.

Figure 2:
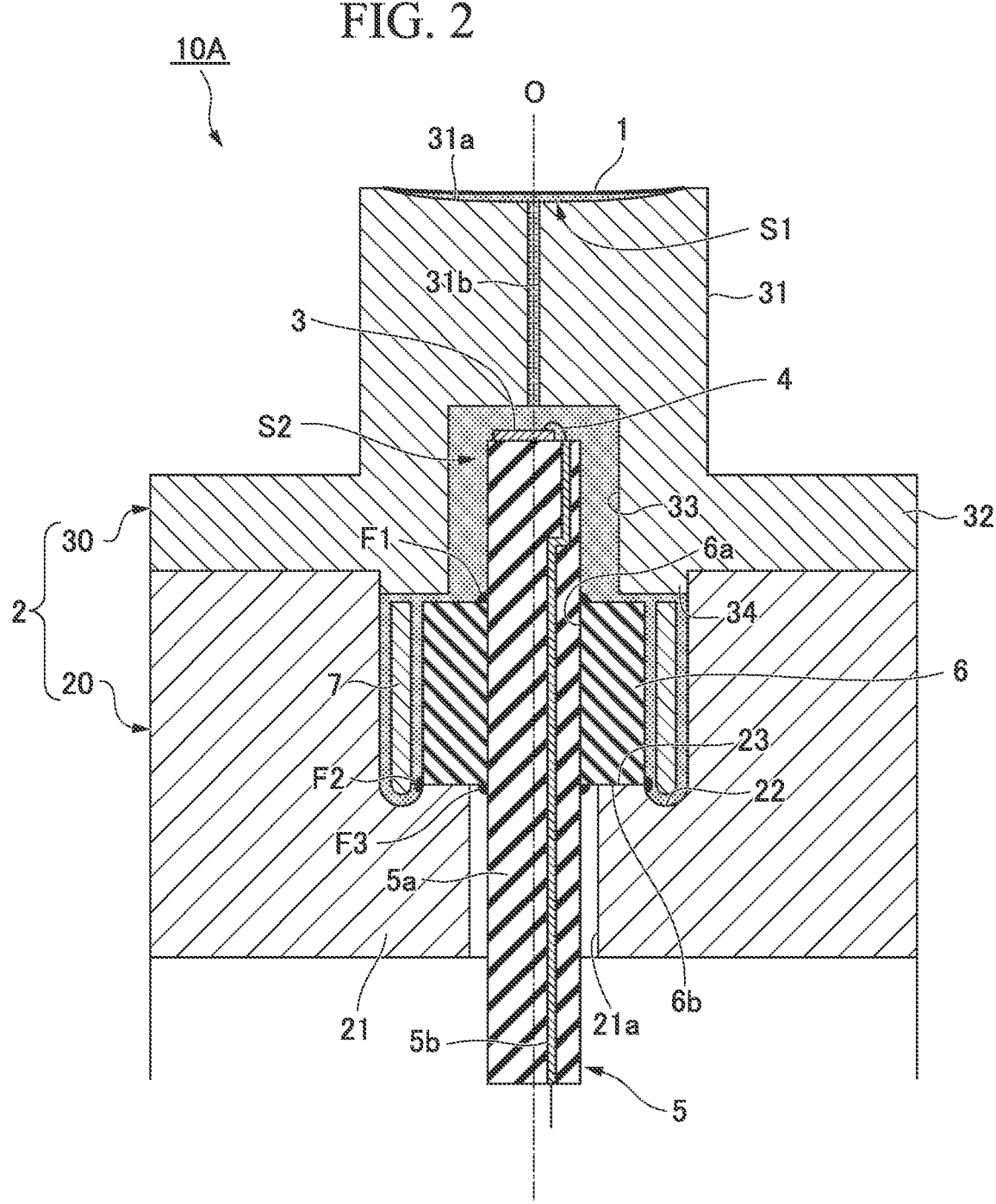
FIG. 2 is a magnified view of FIG. 1.

As shown in FIG. 2, the vessel body 20 has a bottom wall 21 that covers the lower end of the vessel body 20. A through hole 21a passing through the bottom wall 21 in the vertical direction is formed in the bottom wall 21. On the upper surface of the bottom wall 21 (hereinafter, called as a bottom wall-upper surface 23), a groove 22 that is concaved downward is formed. The groove 22 has a curved surface formed at a boundary between the inner peripheral surface of the cylindrical vessel body 20 and the bottom wall-upper surface 23. This curved surface is concaved downward in view of vertical cross section. The curved surface of the groove 22 is continuous with the inner peripheral surface of the vessel body 20 without any step.

The lid member 30 includes a columnar pressure receiver 31, a flange 32 extending outward in the radial direction from the lower end of the pressure receiver 31, a cylindrical fitting portion 34 extending downward from the inner peripheral edge of the flange 32. On the lower surface of the lid member 30, a sensor body container 33 which is concaved upward is formed. The sensor body container 33 is a cylindrical space coaxial with the center axis O. The sensor body 3 is contained in the sensor body container 33. Hereinafter, the space in the sensor body container 33 is called as a measurement chamber S2. The lid member 30 is not necessary to have the flange 32.

A concave portion 31a which is concaved downward is formed on the upper surface of the pressure receiver 31. The concave portion 31a is formed in a curved shape which is concaved downward. The diaphragm 1 covers the concave portion 31a, and a pressure receiving chamber S1 is formed between the diaphragm 1 and the concave portion 31a. A communicating hole 31b passing through the pressure receiver 31 in the vertical direction is formed at a center of the pressure receiver 31 in the radial direction. The upper end of the communicating hole 31b opens toward the pressure receiving chamber S1, and the lower end of the communicating hole 31b opens toward the measurement chamber S2. That is, the communicating hole 31b communicates the pressure receiving chamber S1 and the measurement chamber S2.

The enclosed liquid is filled in the pressure receiving chamber S1, the communicating hole 31b, and the measurement chamber S2. This enclosed liquid transmits the pressure received by the diaphragm 1 to the sensor body 3.

The lower surface of the flange 32 is in contact with the upper surface of the vessel body 20. The fitting portion 34 is formed coaxially with the center axis O, and the fitting portion 34 is fitted to the peripheral wall of the vessel body 20. With this structure, the lid member 30 seals the upper end opening of the vessel body 20. The boundary between the vessel body 20 and the lid member 30 is welded by electron beam welding or the like. For example, the welding portion between the vessel body 20 and the lid member 30 is strong enough not to be peeled off even if a pressure of several hundred MPa is applied to the enclosed liquid in the measurement chamber S2.

(Electric Wiring Member)

The electric wiring member 5 is disposed coaxially with the center axis O, and the electric wiring member 5 is a substantially columnar member extending in the vertical direction. The electric wiring member 5 is inserted into the through hole 21a of the vessel body 20, and the electric wiring member 5 passes through the bottom wall 21 of the vessel body 20 in the vertical direction. Therefore, the upper end of the electric wiring member 5 is located in the measurement chamber S2, and the lower end of the electric wiring member 5 is located outside the pressure vessel 2. The sensor body 3 is disposed at the upper end of the electric wiring member 5.

The electric wiring member 5 includes a base portion (or base) 5a having non-conductivity and a wiring 5b having conductivity. Most of the wiring 5b is embedded in the base portion 5a. A part of the wiring 5b is exposed to the outside of the base portion 5a at a place of the base portion 5a located inside the pressure vessel 2 and a place of the base portion 5a located outside the pressure vessel 2.

In one or more embodiments, the wiring 5b is exposed at the upper end and the lower end of the base portion 5a. The wiring 5b is electrically connected to the lead wire 4 at the upper end of the base portion 5a, and the wiring 5b is electrically connected to the electronic circuit 11 at the lower end of the base portion 5a. The lead wire 4 is electrically connected to the sensor body 3. With this structure, the wiring 5b of the electric wiring member 5 electrically connects the sensor body 3 and the electronic circuit 11 by using the lead wire 4.

In one or more embodiments, the base portion 5a is made of ceramic, and the wiring 5b is made of tungsten. For example, the base portion 5a can be formed by laminating a plurality of plate-like ceramics and sintering them together. In this case, the wiring 5b can be formed by printing a wiring pattern of tungsten on the surface of the ceramic plate of the base portion 5a. Further, for example, a wiring pattern may be printed on the surface of the plurality of ceramic plates, and these wiring patterns may be connected by via holes. Thereby, the wiring 5b can be extended in the stacking direction of the ceramic plates.

In a case that the electric wiring member 5 is manufactured by such a method, for example, the enclosed liquid can be prevented from leaking out through the electric wiring member 5 to the outside, and the electrical signal of the sensor body 3 can be transmitted to the outside of the pressure vessel 2.

The method of manufacturing the electric wiring member 5 is not limited to the above example, and may be changed appropriately.

(Fixing Member)

The fixing member 6 is formed in a ring shape arranged coaxially with the center axis O, and the fixing member 6 is fitted over the electric wiring member 5. As the material of the fixing member 6, metal material and insulating material can be used.

The inner peripheral surface 6a of the fixing member 6 is in contact with the outer peripheral surface of the electric wiring member 5. The inner peripheral surface 6a of the fixing member 6 is brazed to the outer peripheral surface of the electric wiring member 5 by silver solder or the like. A fillet F1 (first fillet) made of brazing material is formed at a boundary between the upper end-opening edge of the fixing member 6 and the electric wiring member 5. That is, the fillet F1 is formed at the joining portion between the electric wiring member 5 and the fixing member 6, and the fillet F1 is in contact with the enclosed liquid.

The fillet F1 is formed over the entire periphery of the upper end-opening edge of the fixing member 6. Similarly, a fillet F3 (third fillet) made of brazing material is formed at a boundary between the lower end-opening edge of the fixing member 6 and the electric wiring member 5.

The lower surface 6b of the fixing member 6 is in contact with the bottom wall-upper surface 23 of the vessel body 20.

The lower surface 6b of the fixing member 6 is brazed to the bottom wall-upper surface 23 by silver solder or the like. A fillet F2 (second fillet) made of brazing material is formed at a boundary between the outer peripheral edge of the lower end of the fixing member 6 and the bottom wall-upper surface 23 of the vessel body 20. That is, the fillet F2 is formed at the joining portion between the fixing member 6 and the pressure vessel 2, and the fillet F2 is in contact with the enclosed liquid.

The fillet F2 is formed over the entire periphery of the outer peripheral edge at the lower end of the fixing member 6. A part of the fillet F2 is located in the groove 22.

(Spacer Member)

The spacer member 7 is formed in a ring shape arranged coaxially with the center axis O, and the spacer member 7 is fitted over the fixing member 6. In FIG. 2, the gap between the spacer member 7 and the fixing member 6 and the gap between the spacer member 7 and the vessel body 20 are exaggeratedly expressed, and these gaps are actually very small. Therefore, the spacer member 7 is used for determining the radial position of the fixing member 6 and the electric wiring member 5 with respect to the pressure vessel 2.

The enclosed liquid exists in the gap between the spacer member 7 and the fixing member 6 and in the gap between the spacer member 7 and the vessel body 20. As a result, the pressure of the enclosed liquid acts on the electrical wiring member 5 and the fixing member 6 with good balance.

Next, working of the sensor 10A will be described.

When the diaphragm 1 receives a high pressure, the pressure acting on the enclosed liquid increases. For example, the pressure acting on the enclosed liquid may exceed several hundred MPa. When such a high pressure acts on the enclosed liquid, it is concerned that the joining portions between the different materials may be peeled off. In one or more embodiments, the joining portion between the electric wiring member 5 and the fixing member 6 and the joining portion between the fixing member 6 and the vessel body 20 correspond to the joining portions between different materials. For this reason, it is important that these joining portions are not peeled off.

In one or more embodiments, the fillet F1 of brazing material is formed at the joining portion between the electric wiring member 5 and the fixing member 6, which is in contact with the enclosed liquid. Similarly, the fillet F2 of brazing material is formed at the joining portion between the fixing member 6 and the vessel body 20, which is in contact with the enclosed liquid. These fillets F1 and F2 can prevent the enclosed liquid from entering the joining portion between the electrical wiring member 5 and the fixing member 6 and the joining portion between the fixing member 6 and the vessel body 20, and can also prevent the peeling force from acting on these joining portions. Therefore, the enclosed liquid can be prevented from leaking out due to peeling of these joining portions, and the pressure resistance performance of the sensor 10A can be improved.

Since the electric wiring member 5 is formed in the columnar shape, the stress acting on the joining portion between the electric wiring member 5 and the fixing member 6 can be decreased.

Since the electric wiring member 5 is made of the laminated ceramic material, for example, the joining strength of the wiring 5b can be greater than the case of sealing glass, the density of the wiring can be increased, and the pressure resistance performance of the sensor 10A can be further improved.

Since the groove 22 of the vessel body 20 is formed in a curved surface shape, the tensile stress acting on the groove 22 can be decreased. Thereby, the strength of the vessel body 20 can be improved.

Since the spacer member 7 is disposed between the fixing member 6 and the vessel body 20, the position of the fixing member 6 in the radial direction with respect to the vessel body 20 can be easily determined, and it can be assembled easily. Further, the amount of the enclosed liquid filled in the groove 22 and the above area of the groove 22 can be decreased.

The periphery of the electric wiring member 5 may be metallized, and the fixing member 6 of insulating material may be provided between the electric wiring member 5 and the pressure vessel 2. In this case, electric noises on the pressure vessel 2 can be prevented from being transmitted to the electric wiring member 5.

Next, additional embodiments of the present invention will be described, but the basic configuration is the same as that of the previously-described embodiments. Therefore, in FIG. 3, parts that correspond to those in FIG. 2 are assigned the same reference numerals, and the descriptions thereof will be omitted.

In one or more embodiments, means for fixing the electric wiring member 5 to the pressure vessel 2 is different from that in the previously-described embodiments.

Figure 3:
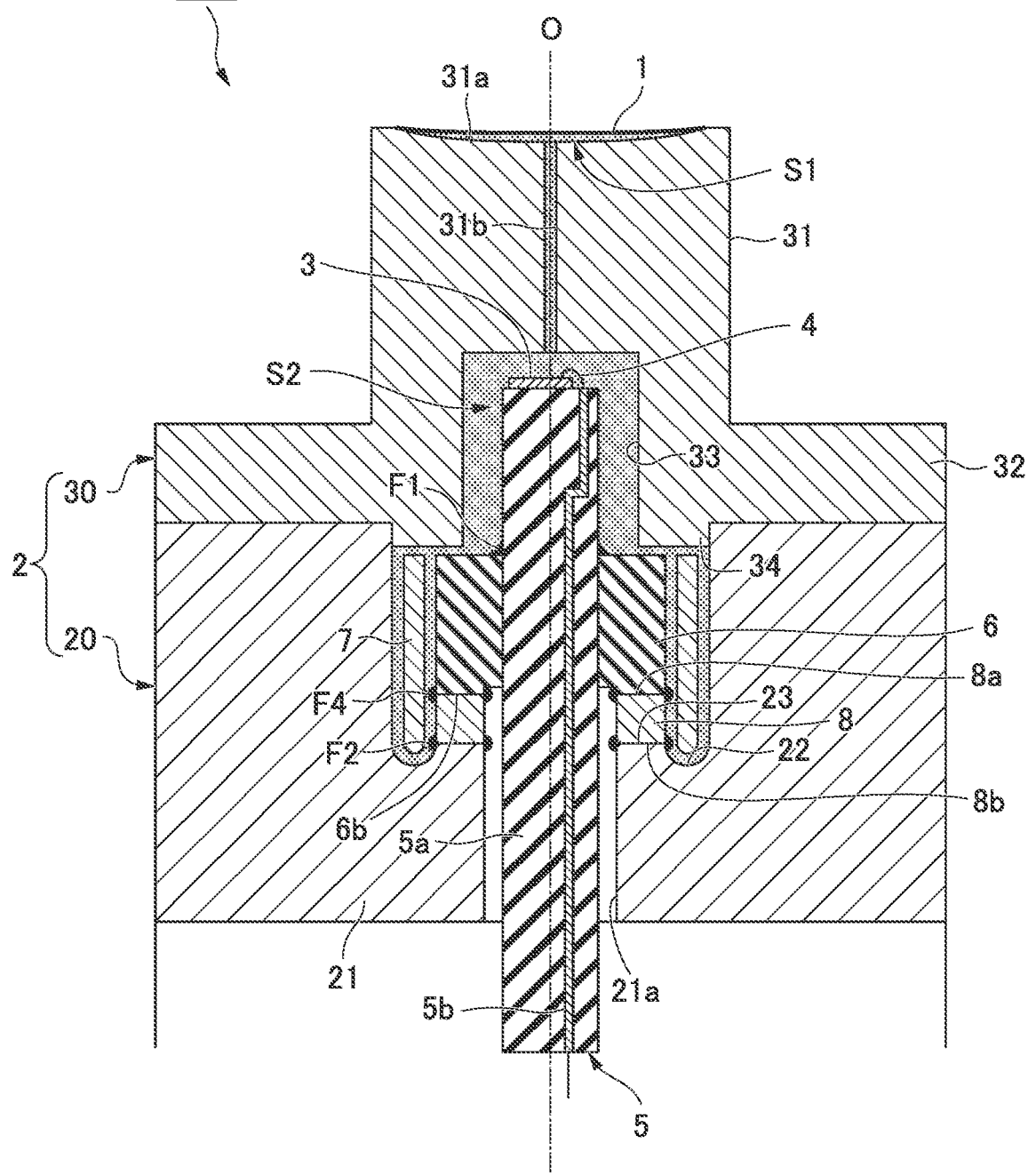
FIG. 3 is a drawing illustrating a vertical section of the sensor according to one or more embodiments.

As shown in FIG. 3, in the sensor 10B of one or more embodiments, a fixing member 8 (a second fixing member) is provided between the fixing member 6 and the bottom wall 21 of the vessel body 20. The fixing member 8 is sandwiched between the fixing member 6 and the vessel body 20 in the vertical direction.

The fixing member 6 and the fixing member 8 are made of different materials. In one or more embodiments, the electric wiring member 5 is fixed to the pressure vessel 2 by the plurality of fixing members 6 and 8 made of different materials.

The fixing member 8 is formed in a ring shape. The upper surface 8a of the fixing member 8 is joined to the lower surface 6b of the fixing member 6 by brazing or the like. A fillet F4 is formed at this joining portion, which is in contact with the enclosed liquid. The lower surface 8b of the fixing member 8 is joined to the bottom wall-upper surface 23 of the vessel body 20 by brazing or the like. The fillet F2 is formed at this joining portion, which is in contact with the enclosed liquid.

For example, the material of the fixing member 8 may be a metal whose linear expansion coefficient is intermediate between the fixing member 6 and the vessel body 20. In this case, the stress acting on the joining portion due to the difference in coefficient of linear expansion can be decreased.

Specifically, for example, in the configuration of FIG. 2, the shearing force generated due to temperature change acting on the joining portion between the bottom wall-upper surface 23 and the lower surface 6b of the fixing member 6 becomes greater in proportion to the difference in linear expansion coefficient of the fixing member 6 and the vessel body 20.

To the contrary, in the configuration of FIG. 3, the shearing force acting on the joining portion between the lower surface 6b of the fixing member 6 and the upper surface 8a of the fixing member 8 and the shearing force acting on the joining portion between the lower surface 8b of the fixing member 8 and the bottom wall-upper surface 23 become smaller than the previously-described embodiments shown in FIG. 2. This is because the difference in linear expansion coefficient between the fixing member 6 and the fixing member 8 and the difference in linear expansion coefficient between the fixing member 8 and the vessel body 20 are smaller than the difference in linear expansion coefficient between the fixing member 6 and the vessel body 20.

As described above, in the sensor 10B of one or more embodiments, the fixing member 6 and the fixing member 8 are made of different materials. The fixing member 8 whose linear expansion coefficient is closer to the pressure vessel 2 than that of the fixing member 6 is joined to the pressure vessel 2. The fixing member 8 whose linear expansion coefficient is closer to the electric wiring member 5 than the fixing member 6 is joined to the electric wiring member 5. With this structure, the shearing force caused by the temperature change, which acts on the joining portion between the respective members, can be decreased. Therefore, it is possible to prevent the joining portion from being peeled off due to the stress caused by the temperature change, and also possible to prevent the enclosed liquid from leaking.

As in the previously-described embodiments, the periphery of the electric wiring member 5 may be metallized, and the fixing member 6 of insulating material may be provided between the electric wiring member 5 and the pressure vessel 2. In this case, electric noises on the pressure vessel 2 can be prevented from being transmitted to the electric wiring member 5.

Next, additional embodiments of the present invention will be described, but the basic configuration is the same as that of the previously-described embodiments. Therefore, in FIG. 4, parts that correspond to those in FIG. 2 are assigned the same reference numerals, and the descriptions thereof will be omitted.

Figure 4:
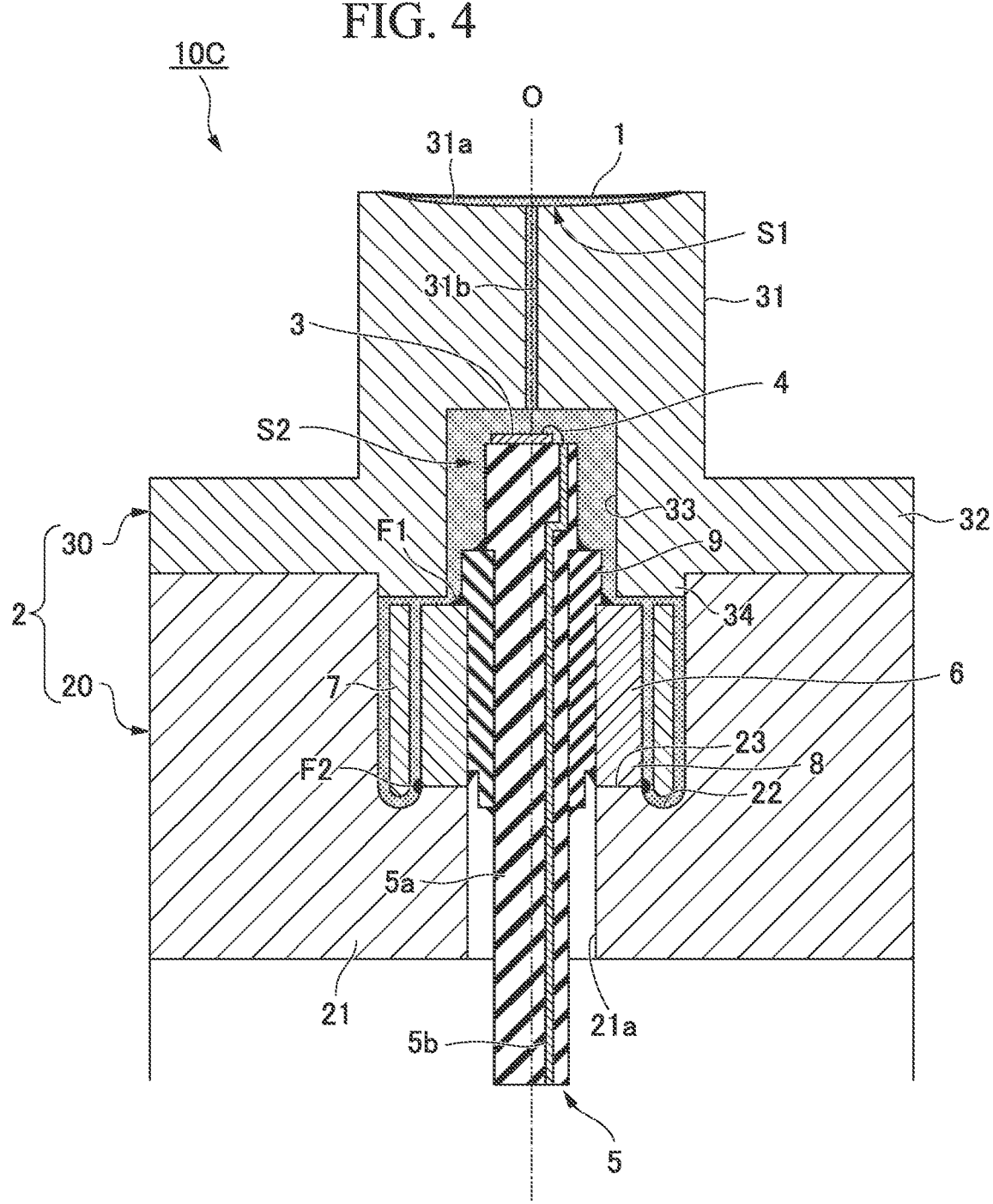
FIG. 4 is a drawing illustrating a vertical section of the sensor according to one or more embodiments.

As shown in FIG. 4, the sensor 10C of one or more embodiments includes an intermediate member 9 integrated with the electric wiring member 5. The intermediate member 9 is disposed between the electric wiring member 5 and the fixing member 6. The intermediate member 9 is made of insulator or metal. The intermediate member 9 is formed in a cylindrical shape and is fitted over the electric wiring member 5. The intermediate member 9 is fitted in the fixing member 6. The fillet F1 is formed at the joining portion between the intermediate member 9 which is a part of the electric wiring member 5 and the fixing member 6, which is in contact with the enclosed liquid.

With such a structure as well, it is possible to achieve the same function effects as those of the previously-described embodiments.

As in the previously-described embodiments, the periphery of the electric wiring member 5 may be metallized, and the intermediate member 9 of insulating material may be provided between the electric wiring member 5 and the pressure vessel 2. In this case, electric noises on the pressure vessel 2 can be prevented from being transmitted to the electric wiring member 5.

The technical scope of the present invention is not limited to the above-described embodiments, and various modifications can be made without departing from the spirit of the present invention.

For example, in the previously-described embodiments, a metal thin film may be formed on the outer peripheral surface of the electric wiring member 5. With this structure, it is possible to reduce noises acting on the wiring 5b of the electric wiring member 5, for example, when the pressure vessel 2 is charged. That is, this metal thin film can be used as a shield.

As used herein, the following directional terms "front, back, above, downward, right, left, vertical, horizontal, below, transverse, row and column" as well as any other similar directional terms refer to those instructions of a device equipped with one or more embodiments of the present invention. Accordingly, these terms, as utilized to describe one or more embodiments of the present invention should be interpreted relative to a device equipped with one or more embodiments of the present invention. Typical examples of the hardware may include, but are not limited to, a device and a circuit.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A sensor comprising:
   a pressure vessel filled with an enclosed liquid;
   a diaphragm that seals the pressure vessel;
   a sensor body contained in the pressure vessel;
   an electric wire comprising a wiring electrically connected to the sensor body;
   a fixture that fixes the electric wire to the pressure vessel;
   a first fillet at a joining portion between the electric wire and the fixture, wherein the first fillet contacts the enclosed liquid;
   a second fillet at a joining portion between the fixture and the pressure vessel, wherein the second fillet contacts the enclosed liquid; and
   a third fillet at a joining portion between the electric wire and the fixture, wherein the third fillet does not contact the enclosed liquid.

2. The sensor according to claim 1, further comprising a groove in a bottom wall of the pressure vessel, wherein the groove is concaved downward and has a curved surface.

3. The sensor according to claim 1, wherein the electric wire further comprises:
   a base formed by sintering a plurality of ceramic plates; and
   a wiring embedded in the base.

4. The sensor according to claim 1,
   wherein the pressure vessel comprises a cylindrical vessel body and a columnar lid, and
   wherein the cylindrical vessel body and the columnar lid have a common center axis.

5. The sensor according to claim 4, wherein material of the cylindrical vessel body and material of the columnar lid are nickel-based superalloy.

6. The sensor according to claim 4,
   wherein the cylindrical vessel body comprises a bottom wall that covers a lower end of the cylindrical vessel body, and
   wherein the bottom wall has a through hole that vertically passes through the bottom wall.

7. The sensor according to claim 6, further comprising a groove disposed on an upper surface of the bottom wall, wherein the groove is concaved downward and has a curved surface at a boundary between an inner peripheral surface of the cylindrical vessel body and the upper surface of the bottom wall.

8. The sensor according to claim 6, wherein the electric wire is a columnar member that extends in a vertical direction and is inserted into the through hole of the cylindrical vessel body.

9. The sensor according to claim 4, wherein the columnar lid comprises:
a columnar pressure receiver;
a flange that extends outward in a radial direction of the columnar lid from a lower end of the columnar pressure receiver; and
a cylindrical fitting portion that extends downward from an inner peripheral edge of the flange.

10. The sensor according to claim 1, wherein the electric wire comprises:
a base having non-conductivity; and
a wiring having conductivity,
wherein the wiring is exposed at an upper end and a lower end of the base,
wherein the wiring is electrically connected to a lead wire at the upper end of the base, and
wherein the lead wire is electrically connected to the sensor body.

11. The sensor according to claim 1, further comprising a ring-shaped spacer fitted over the fixture.

12. The sensor according to claim 11, wherein the ring-shaped spacer is between the fixture and a cylindrical vessel body.

13. The sensor according to claim 1,
wherein a periphery of the electric wire is metallized.

14. A sensor comprising:
a pressure vessel filled with an enclosed liquid;
a diaphragm that seals the pressure vessel;
a sensor body contained in the pressure vessel;
an electric wire comprising a wiring electrically connected to the sensor body;
a fixture that fixes the electric wire to the pressure vessel;
a first fillet at a joining portion between the electric wire and the fixture, wherein the first fillet contacts the enclosed liquid; and
a second fillet at a joining portion between the fixture and the pressure vessel, wherein the second fillet contacts the enclosed liquid,
wherein the pressure vessel comprises a cylindrical vessel body and a columnar lid,
wherein the cylindrical vessel body and the columnar lid have a common center axis,
wherein the sensor further comprises a sensor body container in a lower surface of the columnar lid, and
wherein the sensor body container is concaved upward and contains the sensor body.

15. A sensor comprising:
a pressure vessel filled with an enclosed liquid;
a diaphragm that seals the pressure vessel;
a sensor body contained in the pressure vessel;
an electric wire comprising a wiring electrically connected to the sensor body;
a fixture that fixes the electric wire to the pressure vessel;
a first fillet at a joining portion between the electric wire and the fixture, wherein the first fillet contacts the enclosed liquid; and
a second fillet at a joining portion between the fixture and the pressure vessel, wherein the second fillet contacts the enclosed liquid,
wherein the pressure vessel comprises a cylindrical vessel body and a columnar lid,
wherein the cylindrical vessel body and the columnar lid have a common center axis,
wherein the columnar lid comprises:
a columnar pressure receiver;
a flange that extends outward in a radial direction of the columnar lid from a lower end of the columnar pressure receiver; and
a cylindrical fitting portion that extends downward from an inner peripheral edge of the flange, and
wherein the sensor further comprises:
a concave portion on an upper surface of the columnar pressure receiver, wherein the concave portion is concaved downward and covered by the diaphragm; and
a pressure receiving chamber between the diaphragm and the concave portion.

16. The sensor according to claim 15,
wherein the columnar pressure receiver has a communicating hole passing through the columnar pressure receiver in a vertical direction, and
wherein the pressure receiving chamber communicates with a measurement chamber via the communicating hole, wherein the measurement chamber is a space in a sensor body container.

17. The sensor according to claim 15,
wherein the flange has a lower surface in contact with an upper surface of the cylindrical vessel body, and
wherein the cylindrical fitting portion is fitted to a peripheral wall of the cylindrical vessel body.

* * * * *